US011279605B2

United States Patent
Soellner et al.

(10) Patent No.: US 11,279,605 B2
(45) Date of Patent: Mar. 22, 2022

(54) ROTARY CLEANING NOZZLE, AND CLEANING SYSTEM FOR CLEANING SURFACES IN A BEVERAGE BOTTLING INSTALLATION

(71) Applicant: KRONES AG, Neutraubling (DE)

(72) Inventors: Juergen Soellner, Neutraubling (DE); Matthias Stubenhofer, Neutraubling (DE); Holger Mueller, Neutraubling (DE)

(73) Assignee: KRONES AG, Neutraubling (DE)

(*) Notice: Subject to any disclaimer, the term of this patent is extended or adjusted under 35 U.S.C. 154(b) by 337 days.

(21) Appl. No.: 16/657,628

(22) Filed: Oct. 18, 2019

(65) Prior Publication Data
US 2020/0122991 A1    Apr. 23, 2020

(30) Foreign Application Priority Data

Oct. 18, 2018  (DE) .................... 10 2018 125 883.6

(51) Int. Cl.
*B67C 3/00* (2006.01)
*B08B 3/02* (2006.01)

(52) U.S. Cl.
CPC ............. *B67C 3/001* (2013.01); *B08B 3/024* (2013.01)

(58) Field of Classification Search
CPC .................................................. B67C 3/001
See application file for complete search history.

(56) References Cited

U.S. PATENT DOCUMENTS

| 1,982,315 A | 11/1934 | Lundberg |
| 2013/0098478 A1 | 4/2013 | Kling et al. |
| 2015/0226177 A1 | 8/2015 | DeFrank et al. |
| 2015/0251199 A1 | 9/2015 | Mickols et al. |

FOREIGN PATENT DOCUMENTS

| CN | 106733354 A | 5/2017 |
| DE | 2712395 A1 | 9/1978 |
| EP | 2914847 A2 | 9/2015 |
| JP | 2004113588 A | 4/2004 |

OTHER PUBLICATIONS

European Search Report and Written Opinion received in European Application No. 19203989.9, dated Mar. 26, 2020.

*Primary Examiner* — Jason Y Ko
(74) *Attorney, Agent, or Firm* — Maschoff Brennan (57) ABSTRACT

A rotary cleaning nozzle for cleaning surfaces of a beverage bottling installation using a fluid, comprising a nozzle assembly which has a feed duct for the fluid, and a nozzle head which is mounted rotatably on the nozzle assembly and has at least one nozzle outlet opening from which, during operation, fluid flowing through the feed duct and the nozzle head emerges in the form of a cleaning jet. The rotary cleaning nozzle furthermore comprises an electrical generator for the induction of electrical energy by way of rotation of the nozzle head, and a control unit for indicating a rotation of the nozzle head in dependence on the induced electrical energy.

20 Claims, 4 Drawing Sheets

ROTARY CLEANING NOZZLE, AND CLEANING SYSTEM FOR CLEANING SURFACES IN A BEVERAGE BOTTLING INSTALLATION

CROSS-REFERENCE TO RELATED APPLICATION

This application claims priority to German Patent Application No. 10 2018 125 883.6, filed on Oct. 18, 2018.

FIELD

The present invention relates to a rotary cleaning nozzle, and to a cleaning system having such a rotary cleaning nozzle for cleaning surfaces in a beverage bottling installation, for example in an aseptic beverage bottling installation.

BACKGROUND

For compliance with hygiene requirements, with the packaging of foods, use is made of aseptic installations in which process materials are processed under sterile conditions. These include for example aseptic beverage bottling installations.

Such installations have clean rooms which are delimited from the surroundings and which are passed through both by the containers to be filled and by the filling product and in which treatment stations for treating the containers are arranged. These may include for example stretch-blow-moulding stations for producing from preforms containers to be filled, rinsing stations for rinsing the containers, bottling stations for filling the containers with a filling product, and capping stations for capping the containers filled with the filling product.

For compliance with the hygiene requirements, the clean rooms routinely, or as required (for example after interruptions in operation), undergo cleaning and subsequent sterilization. The cleaning is normally realized by subjecting the respective installation components to the action of a cleaning medium, by means of which product residues can be rinsed off. Subsequently, a disinfection medium or a sterilization medium can be applied. The respective cleaning, sterilization and/or disinfection media are normally applied to the respective installation components by means of nozzles introduced in the installation.

Among the nozzles for applying the respective cleaning, sterilization and/or disinfection media to the installation components, stationary nozzles which are able to use different spray patterns are known.

For spraying the respective cleaning, sterilization and/or disinfection media, rotary cleaning nozzles which are used for specific applications for cleaning and disinfection in the clean rooms are also known. Said rotary cleaning nozzles are distinguished by a nozzle head which rotates during operation and which can apply the respective cleaning, sterilization and/or disinfection media to the installation components with a rotationally symmetrical spray pattern over a large area. Via the rotational movement, it is also possible for the mechanical cleaning component to be intensified since a concentrated cleaning media jet can periodically smear a predefined surface.

Signs of wear or impurities in the respective cleaning, sterilization and/or disinfection media can lead to failure or to a malfunction of individual rotary cleaning nozzles. This can be reflected for example by blocking of the rotation of the nozzle head. In the event of such a malfunction, there is however the risk that installation surfaces, for example surfaces of the clean room housing, are not acted on completely by the respective medium and are thus not correctly cleaned and/or sterilized.

There is thus a need for a monitoring system which indicates a malfunction of cleaning rotary nozzles.

Capacitive throughflow sensors which are arranged upstream of the rotary cleaning nozzle in a feed line and monitor a throughflow of the cleaning agent in the direction of the rotary cleaning nozzle are known from the prior art. However, a malfunction brought about by blocking of the rotational movement of the nozzle head cannot be determined by such throughflow sensors.

A monitoring device for cleaning nozzles for the inner cleaning of food product tanks is furthermore known from DE 29 18 476 A1. The monitoring device comprises a contact transmitter, in particular a magnet, which is moved synchronously with the rotary cleaning nozzle and which inductively influences a contact receiver, arranged outside the cleaning nozzle, for monitoring the rotational frequency of the rotary cleaning nozzle.

BRIEF DESCRIPTION OF THE FIGURES

Embodiments of the invention will be discussed on the basis of the following description of the figures, in which, schematically.

DETAILED DESCRIPTION

Taking the known prior art as a starting point, it is an object of the disclosure to provide an improved rotary cleaning nozzle for cleaning surfaces in a beverage bottling installation, whose operation can be reliably monitored and which at the same time has a modular design. It is also an object of the disclosure to provide a cleaning system having such a rotary cleaning nozzle.

The objects may be achieved by a rotary cleaning nozzle that may include one or more of the features of described in claim 1 and by a cleaning system that may include one or more of the features of claim 15. Other refinements emerge from the dependent claims, and from the present description and the figures.

Accordingly, a rotary cleaning nozzle for cleaning surfaces of a beverage bottling installation by means of a fluid, comprising a nozzle assembly which has a feed duct for the fluid, and a nozzle head which is mounted rotatably on the nozzle assembly and has at least one nozzle outlet opening from which, during operation, fluid flowing through the feed duct and the nozzle head emerges in the form of a cleaning jet, is proposed. The rotary cleaning nozzle furthermore comprises an electrical generator for the induction of electrical energy by way of rotation of the nozzle head, and a control unit for indicating a rotation of the nozzle head in dependence on the induced electrical energy.

In the proposed rotary cleaning nozzle, the electric generator is configured such that, with correct operation, that is to say with rotation of the nozzle head, it provides electrical energy induced by the rotation. The energy induced in this manner can be used by the control unit for indicating a rotation of the nozzle head and thus correct operation of the rotary cleaning nozzle. However, the induced electrical energy can be used not only as an indicator for the presence of a rotation of the nozzle head, but also for the actuation of the control unit. In other words, the electrical generator can serve as an energy source for the control unit. In this way, a small part of the kinetic and internal energy of the fluid flowing through the rotary cleaning nozzle can be used for operating the control unit. In general, such a conversion or branching-off of small quantities of electrical energy for consumers with low power from energy sources already available in the system, such as for example a fluid flow, is also referred to as "energy harvesting".

This structural and functional configuration may make it possible for the rotary cleaning nozzle to detect and indicate a malfunction of the rotary cleaning nozzle independently, that is to say without coupling to components outside the rotary cleaning nozzle. As a result, provision is thus made of a rotary cleaning nozzle which is equipped with a monitoring system for malfunctions and at the same time has a modular construction, in which dependencies and interfaces with respect to other components, such as for example a stationary monitoring unit or a power supply of the beverage bottling installation, are minimized. This modular construction has the effect that the proposed rotary cleaning nozzle is able to be used in a flexible and exchangeable manner in current beverage bottling installations without this resulting in a high matching requirement for the overall system.

The proposed rotary cleaning nozzle is preferably provided for cleaning surfaces in a beverage bottling installation, but can be used in any aseptic installations or other installations for cleaning surfaces.

The cleaning effect of the rotary cleaning nozzle is due to the fluid emerging from the nozzle head via the nozzle outlet opening. The fluid may be gaseous or liquid. Preferably, the fluid is a cleaning agent which has a chemical structure which is favourable for the cleaning. For example, the fluid may be an agent for sterilizing the surfaces, a so-called sterilizer. Accordingly, the fluid may comprise for example hydrogen peroxide ($H_2O_2$) or peracetic acid.

So as, during operation, to ensure by means of the fluid uniform action over a large area on the surfaces to be cleaned, the nozzle head may be actuated rotationally relative to the nozzle assembly. For this purpose, the rotary cleaning nozzle may be configured such that the fluid to be fed to the nozzle head during operation via the feed duct, and to flow therethrough, rotationally actuates the nozzle head. More precisely, when flowing through the nozzle head, the fluid can exert a force, in particular a recoil force, on the nozzle head, which brings about a torque and thus the rotation of the nozzle head. In other words, the fact that the fluid flows through the nozzle head means that the latter experiences a recoil and is thus rotationally actuated.

For generating the force which rotationally actuates the nozzle head, the nozzle head may be designed such that, upon rotational actuation, it expels the cleaning jet from the nozzle outlet opening in a direction facing away from a rotation direction of the nozzle head, in particular in a direction opposite the rotation direction. Furthermore, the nozzle head may be designed such that the fluid is diverted when flowing through said nozzle head. Accordingly, the nozzle head may be provided with at least one feed section, which diverts into the direction of the nozzle outlet opening fluid which is able to be fed to the nozzle head via the feed duct.

Alternatively or in addition, the rotational cleaning nozzle may be configured such that a rotary drive rotationally actuates the nozzle head. The rotary drive may for example be an electric motor.

In order for the nozzle head to be mounted rotationally on the nozzle assembly, at least one plain bearing, in particular a rotary plain bearing, may be provided between the nozzle head and the nozzle assembly. The plain bearing may be provided with a clearance fit.

The nozzle assembly may be of sleeve-like form. Accordingly, the nozzle head may be of ring-like form and pushed axially onto the nozzle assembly. In this configuration, it is possible to provide at opposite ends of the nozzle head in the axial direction of the nozzle assembly in each case one plain bearing, between which plain bearings the at least one feed section of the nozzle head and the at least one feed opening of the nozzle assembly may be arranged.

The nozzle assembly may be provided with a cutout which is open on one side and which forms the feed duct for the fluid. The feed duct preferably extends along an axial direction of the nozzle assembly. The cutout in the form of a feed duct may be of cylindrical form. The at least one feed opening may open into the cutout. The feed duct may be in the form of a passage opening in a side wall of the nozzle assembly and in particular extend along a radial direction of the nozzle assembly. The nozzle assembly may have a multiplicity of feed openings which may be formed with regular spacings to one another in a circumferential direction of the nozzle assembly. For example, the nozzle assembly may have in its side wall two feed openings arranged opposite one another.

For the induction of electrical energy by way of rotation of the nozzle head, the rotary cleaning nozzle comprises the electrical generator. In general, an electrical generator is to be understood as meaning a device for converting kinetic energy into electrical energy by means of electromagnetic induction. The basic construction of an electrical generator is known from the prior art to a person skilled in the art and is not described in detail here. Thus, in the following text, only special features of the rotary cleaning nozzle disclosed here will be discussed.

The generator in the rotary cleaning nozzle may comprise a rotor which is arranged on or in the nozzle head, and a stator which is aligned with said rotor and is arranged on or in the nozzle assembly. In the present case, a stator is to be understood as meaning a fixed component of the generator. Accordingly, a rotor is to be understood as meaning a moving, in particular rotating, component of the generator. In one embodiment, the rotor may be provided in the form of at least one magnet and the stator may be provided in the form of at least one induction coil. Alternatively, the rotor may be provided in the form of at least one induction coil and the stator may be provided in the form of at least one magnet.

For example, the nozzle head may be provided with the magnet and the nozzle assembly may be provided with the induction coil. In this embodiment, the control unit may be arranged together with the induction coil in or on the nozzle assembly. Alternatively or in addition, the nozzle head may be provided with the induction coil and the nozzle assembly may be provided with the magnet. In this embodiment, the control unit may be arranged together with the induction coil in or on the nozzle head.

The magnet preferably comprises at least one permanent magnet. According to the configuration of the nozzle head or of the nozzle assembly, the magnet may be a magnet ring constructed from multiple permanent magnets, comprising a multiplicity of magnetic poles arranged adjacent to one another in a circumferential manner Here, magnetic poles arranged in each case adjacent to one another in a circumferential direction preferably have a different polarity.

The induction coil may be provided as an annular coil having a multiplicity of windings. In one refinement, the generator may be provided in the form of a so-called claw pole generator, in which the annular coil is embedded in a ferromagnetic cage or a ferromagnetic jacket. The cage may be provided such that, on a side facing the magnet, in particular the magnet ring, said cage is provided with a multiplicity of areal sections which are spaced apart from one another in a circumferential direction. In other words, on a side facing the magnet, the cage has gaps between the areal sections in a circumferential direction, which gaps extend substantially along the entire width of the cage in a direction perpendicular to the circumferential direction. Said areal sections spaced apart from one another in a circumferential direction are also referred to as so-called "claws".

The number and position of the areal sections are preferably matched to the number and position of the magnetic poles of the magnet which face the annular coil. Preferably, the number of the areal sections corresponds to the number of the magnetic poles of the magnet. The areal sections are in this case preferably aligned relative to the magnetic poles of the magnet. In other words, by rotating the nozzle head relative to the nozzle assembly, it is possible for the magnet to be able to be positioned relative to the cage, and to the annular coil embedded therein, such that in each case one areal section of the cage faces in each case one magnetic pole of the magnet ring.

This configuration of the generator proposed as a claw pole generator has the effect that high voltages and currents can be induced with a relatively compact design of the generator. In other words, it is possible in this way to realize a compact and simultaneously powerful generator in the rotary cleaning nozzle.

The generator, in particular the induction coil, is preferably connected in an electrically conductive manner to the control unit in order to feed the electrical energy induced by the generator to the control unit. The control unit may be correspondingly configured to indicate a rotation of the nozzle head when the latter is fed electrical energy induced by the generator. The electrical energy induced by the generator can be used for operating the control unit. For example, the control unit can be operated in a switched-on and a switched-off state in dependence on the electrical energy fed by the generator. More precisely, the control unit can be operated in the switched-on state, in which rotation of the nozzle head is indicated, when electrical energy is fed to the control unit from the generator. Correspondingly, the control unit can be operated in the switched-off state, in which a rotation of the nozzle head is not indicated, when the feeding of electrical energy is interrupted.

The rotary cleaning nozzle may furthermore be configured for feeding the electrical energy induced by the generator to the control unit in the form of direct current or alternating current. For example, the electrical generator may be configured for the induction of alternating current, wherein it is possible for a commutator coupled to the rotation of the nozzle head, or a rectifier, for example a bridge rectifier or a half-wave rectifier, to be interposed between the generator and the control unit. In this way, the electrical energy induced by the generator can be fed to the control unit in the form of direct current.

In one refinement, the rotary cleaning nozzle may comprise an energy store, in particular in the form of a capacitor. The energy store is preferably connected in an electrically conductive manner to the generator, in particular to the induction coil. Accordingly, the energy store is able to be charged by the electrical energy induced by the generator. The rotary cleaning nozzle may be designed such that energy induced by the generator is able to be fed to the energy store in the form of direct current. For this purpose, in the electrical connection between the energy store and the generator, in particular the induction coil, provision may be made of a commutator coupled to the rotation of the nozzle head, or a rectifier, for example a bridge rectifier or a half-wave rectifier. The electrical energy store may furthermore be connected in an electrically conductive manner to the control unit and configured for feeding the electrical energy stored therein to the control unit.

The use of the energy store makes it possible for the control unit to be able to indicate a rotation of the nozzle head in a state in which the nozzle head no longer rotates and thus induces no electrical energy. In this way, even after its operation has ended, for example after a cleaning process has ended, the rotary cleaning nozzle makes it possible for the control unit to be able to indicate whether a correct operation, that is to say a rotation of the nozzle head, has taken place. This is particularly helpful if an inspection of the rotary cleaning nozzle is realized after its operation has ended, for example after a cleaning process has ended.

For the purpose of indicating the rotation of the nozzle head, the control unit may be provided in the form of an emitter, which, in response to the electrical energy induced by the generator, emits a signal. In other words, the control unit may be configured such that, in response to the electrical energy induced by the generator, it emits a signal indicating the rotation of the nozzle head. In particular, the control unit may be configured such that, in a state, in particular in the switched-on state, in which the control unit is fed electrical energy from the generator or from the energy store, it emits the signal indicating the rotation of the nozzle head.

The signal indicating the rotation of the nozzle head may be an electromagnetic signal, in particular light or a radio signal, and/or an electrical signal. Furthermore, the control unit may be configured for interaction with a receiver which receives the signal. The receiver may be connected to a stationary monitoring unit of the beverage bottling installation, which stationary monitoring unit processes the signal received and displays said signal visually, for example on a monitor, for a user of the beverage bottling installation.

Emission of an electromagnetic signal allows the control unit to communicate with the receiver, and accordingly with the stationary monitoring unit, in a cable-free manner. Alternatively or in addition, it is possible for the control unit to emit an electrical signal which is able to be transmitted to the receiver, and accordingly to the stationary monitoring unit, via a cable connection.

The emission of light as the signal indicating the rotation of the nozzle head allows simple visual inspection for users of the beverage bottling installation for establishing correct operation of the rotary cleaning nozzle. For example, the control unit may be or comprise a light source, in particular a light-emitting diode, which, for emitting light, uses electrical energy provided by the generator or the energy store. In this case, lighting of the light source can indicate proper operation of the rotary cleaning nozzle. It is accordingly possible for a user of the beverage bottling installation to establish a malfunction of the rotary cleaning nozzle if lighting of the light source is absent.

In one embodiment, the control unit may be connected to the induction coil and arranged together therewith in or on the nozzle head or nozzle assembly. It is accordingly possible for the nozzle head or the nozzle assembly to be produced from a material which is able to be passed through by the signal emitted by the control unit. For example, the control unit may be arranged in a further cutout in the nozzle assembly. The further cutout may be closed off so as to be impermeable to the fluid, for example in an air- and/or water-tight manner, by means of a closure cap, in particular by means of a re-closeable closure cap. The closure cap may be produced from a material which is able to be passed through by the signal emitted by the control unit.

A cleaning system for cleaning surfaces in a beverage bottling installation is furthermore provided. The cleaning system comprises the at least one above-disclosed rotary cleaning nozzle and the above-disclosed stationary monitoring unit. The stationary monitoring unit is configured for receiving the signal which is to be emitted by the control unit of the rotary cleaning nozzle and which indicates a rotation of the rotary cleaning nozzle and for outputting information relating to the rotation in response to the signal received.

The stationary monitoring unit may constitute a central monitoring unit of the beverage bottling installation and preferably comprises an output unit, for example a monitor, via which the information relating to the rotation of the nozzle head is output for a user.

Some embodiments will now be described below on the basis of the figures. Here, identical elements, similar elements or elements of identical action are denoted by the same reference signs in the various figures, and in order to avoid redundancies, a repeated description of said elements will, in part, be omitted.

Figure 1:
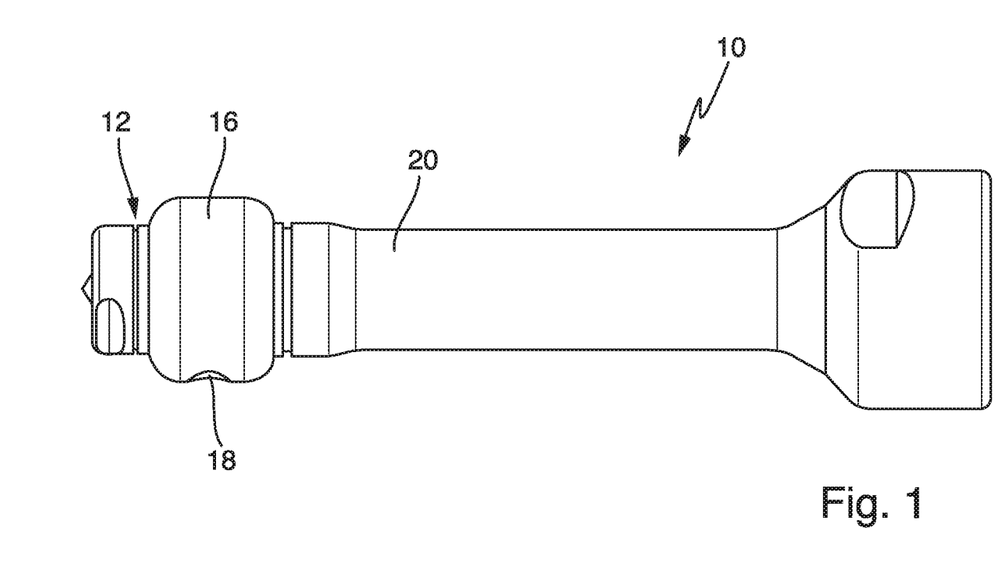
FIG. 1 shows a side view of a rotary cleaning nozzle of a first embodiment.
Figure 2:
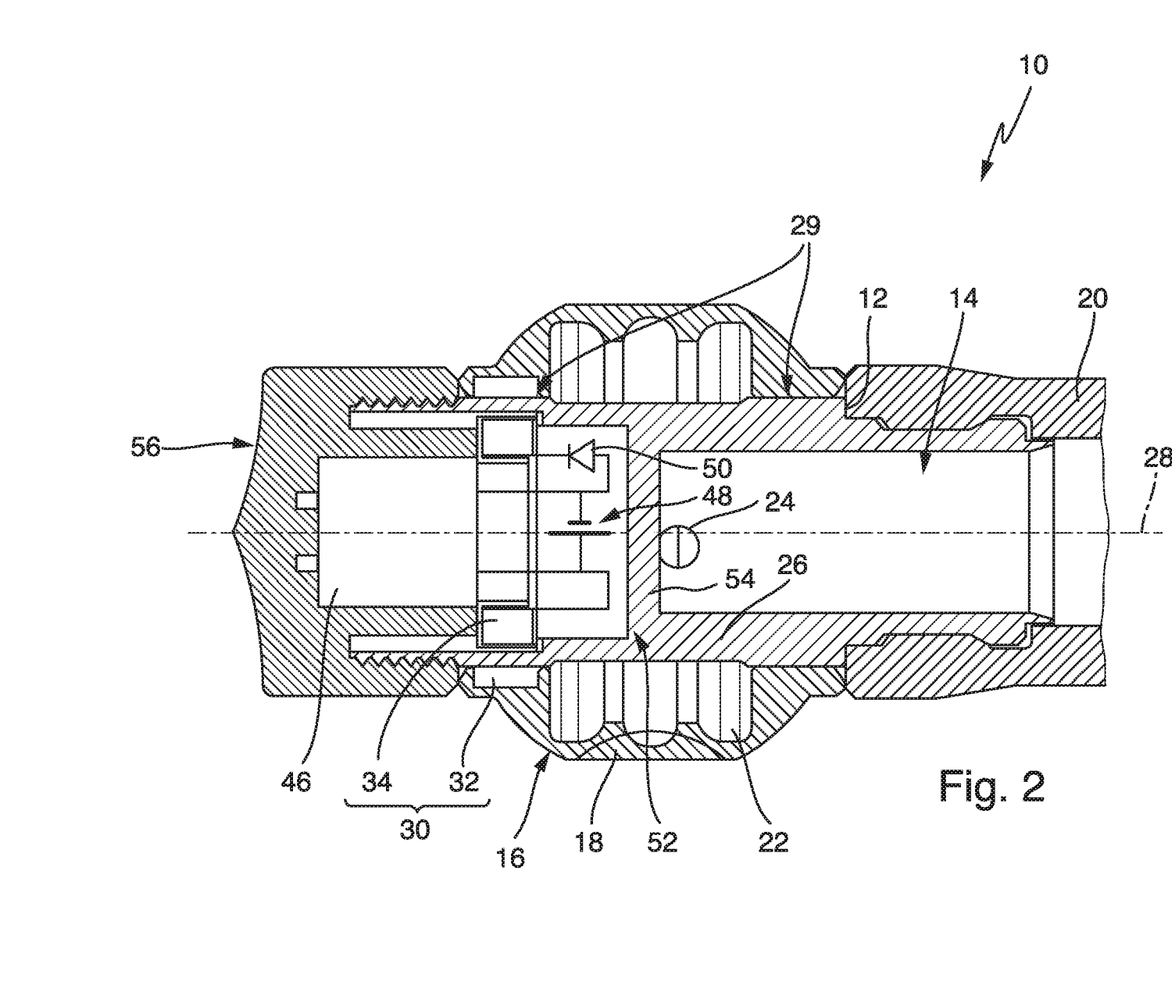
FIG. 2 shows the rotary cleaning nozzle of the first embodiment in a longitudinal sectional view.

FIGS. 1 and 2 schematically show a rotary cleaning nozzle 10 which is provided for cleaning surfaces in a beverage bottling installation. The cleaning is realized by means of a fluid to be sprayed through the rotary cleaning nozzle 10, in particular in the form of a cleaning agent. The rotary cleaning nozzle 10 shown can, in a flexible manner, be used for different fluids, in particular gaseous or liquid cleaning agents. The rotary cleaning nozzle 10 can be correspondingly used for the delivery of the respective cleaning, sterilization and/or disinfection media in a cleaning and/or sterilization sequence of a cleaning programme in a beverage bottling installation.

As shown in FIG. 2, the rotary cleaning nozzle 10 comprises a nozzle assembly 12 which has a feed duct 14 for the fluid, and a nozzle head 16 which is mounted rotatably on the nozzle assembly 12 and which has a nozzle outlet opening 18 from which, during operation, fluid flowing through the feed duct 14 and the nozzle head 16 emerges in the form of a cleaning jet. So as, during operation, to ensure by means of the fluid uniform spraying over a large area of the surfaces to be cleaned and also so as to provide a further mechanical cleaning component, the nozzle head 16 is actuated rotationally relative to the nozzle assembly 12. In other words, during rotation, the nozzle head 16 rotates together with the nozzle outlet opening 18 around the nozzle assembly 12, the latter being able to be fastened fixedly to a stationary fluid line in a clean room of the beverage bottling installation via a connection sleeve 20. The rotation of the nozzle head 16 has the effect that fluid emerging from the nozzle outlet opening 18 is discharged in a uniform and rotationally symmetrical manner.

More precisely, the rotary cleaning nozzle 10 is configured such that the fluid to be fed to the nozzle head 16 via the feed duct 14, and to flow therethrough, rotationally actuates the nozzle head 16. For this purpose, the nozzle head 16 is formed such that, upon rotational actuation, the cleaning jet is expelled from the nozzle outlet opening 18 in a direction facing away from a rotation direction of the nozzle head 16, in particular in a direction opposite the rotation direction. In other words, the cleaning jet also has a tangential component, which thus brings about a recoil and thus a rotation of the nozzle head 16. The nozzle head 16 comprises a feed section 22, which connects the nozzle outlet opening 18 to the feed duct 14 in a fluid-communicating manner. The feed section 22 is formed such that fluid able to be fed to the nozzle head 16 via the feed duct 14 is diverted into a direction of the nozzle outlet opening 18. In this way, it is achieved that fluid emerging via the nozzle outlet opening 18 generates a recoil at the nozzle head 16, and the latter is thereby rotationally actuated. Alternatively or in addition, the rotary cleaning nozzle 10 may be configured such that a rotary drive rotationally actuates the nozzle head 16.

For feeding the fluid from the feed duct 14 into the nozzle head 16, the nozzle assembly 12 comprises at least one feed opening 24, which connects the feed duct 14 to the nozzle head 16, in particular to the feed section 22, in a fluid-communicating manner. The feed openings 24 may be in the form of passage openings which are arranged oppositely in a side wall 26 of the nozzle assembly 12 and which open into the feed duct 14.

The nozzle assembly 12 is of sleeve-like form and is provided with a cylindrical cutout which is open on one side and which forms the feed duct 14 for the fluid. The feed duct 14 extends from an end surface along an axial direction 28 of the nozzle assembly 12. The nozzle head 16 is of ring-like form and is pushed axially onto the nozzle assembly 12. For the rotatable mounting of the nozzle head 16 relative to the nozzle assembly 12, the rotary cleaning nozzle 10 comprises two rotational plain bearings 29, which are arranged at ends of the nozzle head 16 opposite one another in an axial direction 28. The plain bearings 29 are provided with a clearance fit and are thus able to form a rotary bearing which is impermeable to the fluid.

The rotary cleaning nozzle 10 also comprises an electrical generator 30 for the induction of electrical energy by way of rotation of the nozzle head 16 relative to the nozzle assembly 12. For this purpose, a rotor of the generator 30 in the form of a magnet ring 32 is arranged in the nozzle head 16, and is aligned with a stator in the form of an induction coil 34 arranged in the nozzle assembly 12, and rotates relative to said stator during operation. In the embodiment shown here, the induction coil 34 is arranged within the magnet ring 32 in a radial direction. The magnet ring 32 correspondingly rotates around the induction coil 34 during operation. It is alternatively possible for the induction coil 34 to be arranged adjacent to the magnet ring 32 in an axial direction 28.

Figure 3:
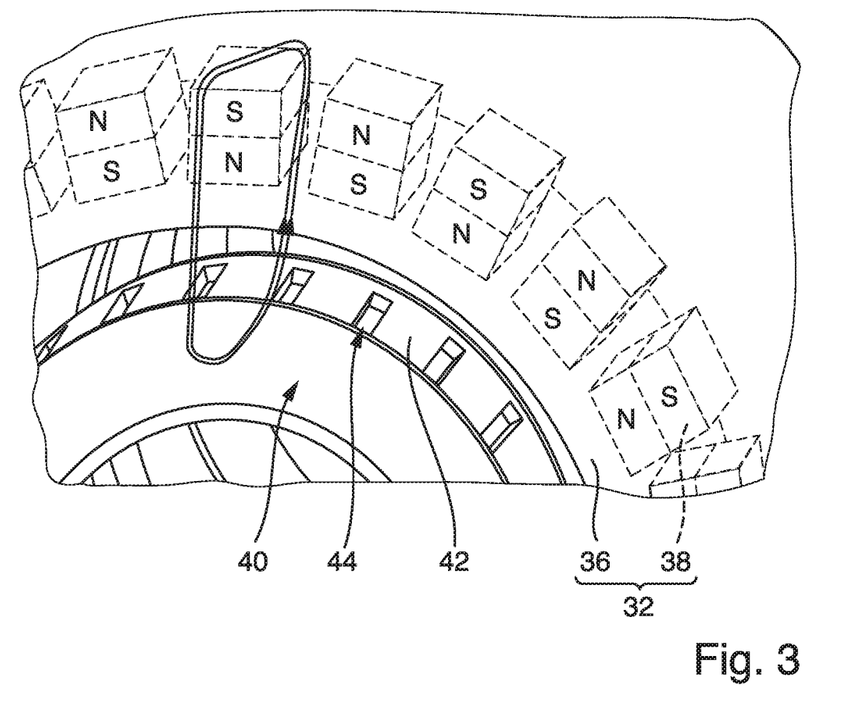
FIG. 3 shows a perspective view of an electrical generator of the rotary cleaning nozzle shown in FIGS. 1 and 2.

As shown in FIG. 3, the magnet ring 32 comprises a magnetic rotor 36 in which use is made of a multiplicity of permanent magnets 38 which are arranged adjacent to one another in a circumferential manner. As indicated in the figure by the letters "N" and "S", which identify a polarity of the permanent magnets 38, magnetic poles arranged in each case adjacent to one another in a circumferential direction have different polarity.

The generator 30 shown here is provided in the form of a claw pole generator, in which the induction coil 34 is an annular coil embedded in a ferromagnetic cage 40. The cage 40 is provided, on a side facing the magnet ring 32, with a multiplicity of areal sections 42 which are spaced apart from one another in a circumferential direction. The areal sections 42 form so-called "claws" of the generator 30, provided as a claw pole generator, which, in the cage 40, are each separated from one another by gaps 44 extending perpendicular to the circumferential direction.

The number and position of the areal sections 42 are matched to the number and position of the magnetic poles which face the induction coil 34. In the configuration shown here, the number of the areal sections 42 corresponds to the number of the permanent magnets 38 arranged adjacent to one another in a circumferential direction. Furthermore, the areal sections 42 are aligned relative to the permanent magnets 38 such that, by rotation of the nozzle head 16 relative to the nozzle assembly 12, the magnet ring 32 can be moved relative to the induction coil 34 into a position in which in each case one areal section 42 of the cage 40 faces a permanent magnet 38.

The rotary cleaning nozzle 10 also comprises a control unit 46 for indicating a rotation of the nozzle head 16 in dependence on the induced electrical energy which is generated by the generator 30. The electrical energy induced by the generator 30 is used by the control unit 46 firstly as an indicator for a rotation of the nozzle head 16, and thus for correct operation of the rotary cleaning nozzle 10, and secondly as an energy source for the actuation thereof.

For this purpose, the control unit 46, as shown in FIG. 2, is connected in an electrically conductive manner to the induction coil 34 of the generator 30 in order for it to be fed the electrical energy induced by the generator 30. The rotary cleaning nozzle 10 furthermore comprises a capacitor 48, which is connected in parallel with the control unit 46 and is connected in an electrically conductive manner to the induction coil 34 of the generator 30. In this configuration, the electrical energy induced by the generator 30 is used both for actuating the control unit 46 and for charging the capacitor 48. As shown in FIG. 2, between the induction coil 34 and in each case the control unit 46 and the capacitor 48, there is arranged a half-wave rectifier 50 in the form of a rectifier diode, which is configured for feeding the alternating current induced by the generator 30 to the capacitor 48 and to the control unit 46 as direct current.

The capacitor 48 serves as an energy store which feeds electrical energy to the control unit 46 even after the end of the rotation of the nozzle head 16 for a limited time. In this way, even after its operation has ended, for example after a cleaning process has ended, the rotary cleaning nozzle 10 makes it possible for the control unit 46 to be able to indicate whether a correct operation, that is to say a rotation of the nozzle head 16, has taken place.

The control unit 46 is configured for being operated in a switched-on or switched-off state in dependence on the electrical energy fed thereto. In the switched-on state, the control unit 46 indicates the rotation of the nozzle head 16. In the switched-off state, by contrast, no rotation of the nozzle head is indicated by the control unit 46. The control unit 46 is operated in the switched-on state when this is fed with electrical energy either by the generator 30 and/or by the capacitor 48. If, by contrast, the feeding of electrical energy is interrupted, the control unit 46 is transferred into the switched-off state.

Here, the control unit 46 is provided in the form of a light-emitting diode (LED) which, in response to the electrical energy induced by the generator 30, emits light in the visible wavelength range. In other words, in this configuration, lighting of the control unit 46 indicates that the nozzle head 16 is rotating and thus the rotary cleaning nozzle 10 is being operated correctly. In this way, a simple visual inspection is made possible for a user of the beverage bottling installation.

Alternatively or in addition, the control unit 46 may be configured for emitting electromagnetic radiation in the non-visible wavelength range. More precisely, the control unit 46 may be configured for emitting the electromagnetic radiation in the non-visible wavelength range in the direction of a detector, for example a stationary monitoring unit. In this case, the detector may be configured for detecting the electromagnetic radiation and for converting this into an output signal, for example an electrical or digital output signal. The output signal can serve here for indicating the state of the rotary cleaning nozzle to the user.

The nozzle assembly 12 is provided with a further cutout 52, in which the induction coil 34, the control unit 46, the capacitor 48 and the half-wave rectifier 50 are arranged. The further cutout 52 is provided as a cutout which is open on one side and which is arranged in the nozzle assembly 12 so as to be opposite the feed duct 14 and which is separated from the latter by means of a separating wall 54. Via a re-closeable closure cap 56, the further cutout 52 is able to be closed off so as to be impermeable to the fluid. For this purpose, at an end of the nozzle assembly 12 which surrounds the further cutout 52, provision is made of an outer thread which is formed in a manner complementary to an inner thread on the closure cap 56. The closure cap 56 is produced from a material which is permeable to the light emitted by the control unit 46.

In an alternative embodiment, it is possible for the components arranged in the further cutout 52 to be arranged in the nozzle head 16 such that the induction coil forms a rotor of the generator 30, wherein the magnet ring may be arranged in the nozzle assembly 12 and may correspondingly form a stator of the generator 30. Correspondingly, the control unit may be arranged together with the induction coil in or on the nozzle head 16.

Figure 4:
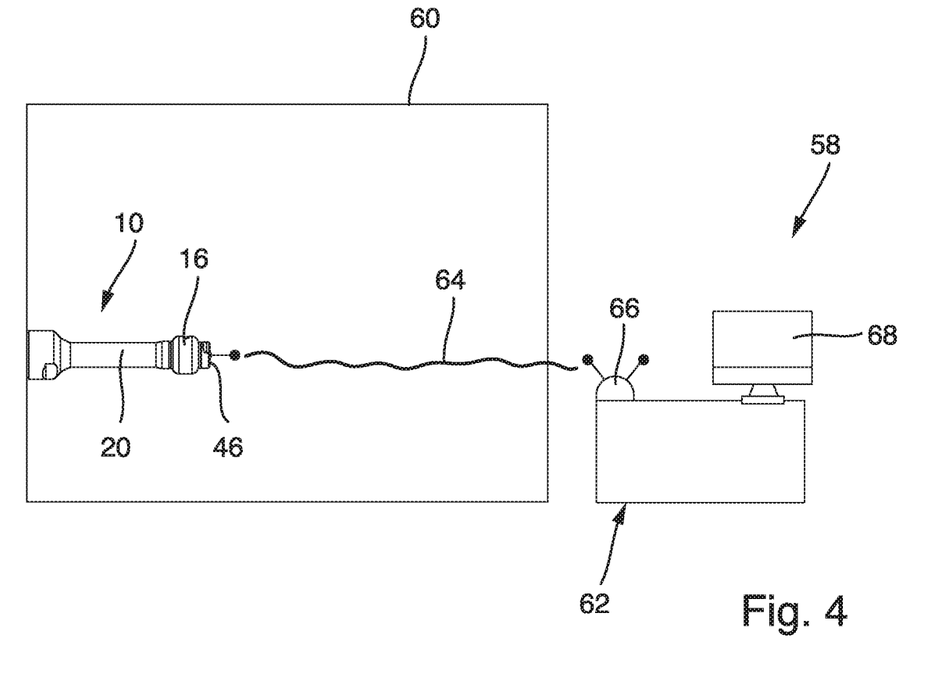
FIG. 4 shows a cleaning system having a rotary cleaning nozzle of a second embodiment.

FIG. 4 shows a cleaning system 58 for cleaning surfaces in a beverage bottling installation. The cleaning system 58 comprises at least one rotary cleaning nozzle 10 of a second embodiment, which is arranged in a clean room 60 of the beverage bottling installation, and a stationary monitoring unit 62, which is arranged outside the clean room 60.

By contrast to the embodiment shown in FIGS. 1 to 3, the control unit 46 of the rotary cleaning nozzle 10 shown in FIG. 4 is configured for emitting an electromagnetic signal in the form of a radio signal 64 as the signal indicating the rotation of the nozzle head 16. The stationary monitoring unit 62 comprises a receiver 66 for receiving the radio signal 64 to be emitted by the control unit 46, and an output unit in the form of a monitor 68 for outputting information relating to the rotation of the nozzle head 16 for a user in response to the radio signal 64 received by the receiver 66. The fact that the control unit 46 emits the radio signal 64 means that the cleaning system 58 shown here allows cable-free communication between the at least one rotary cleaning nozzle 10 and the stationary monitoring unit 62 of the beverage bottling installation.

It is alternatively possible for the control unit 46 of the rotary cleaning nozzle 10 and the receiver 66 to be connected in an electrically conductive manner via a cable, wherein the control unit 46 is able to emit an electrical signal via the cable.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

Where applicable, all the individual features presented in the exemplary embodiments may be combined with one another and/or interchanged without departing from the scope of the invention.

The invention claimed is:

1. A rotary cleaning nozzle for cleaning surfaces of a beverage bottling installation, comprising:
   a nozzle assembly that has a feed duct configured for fluid;
   a nozzle head that is mounted rotatably on the nozzle assembly and that includes at least one nozzle outlet opening from which, during operation, the fluid flowing through the feed duct and the nozzle head emerges in form of a cleaning jet;
   an electrical generator configured for induction of electrical energy by way of rotation of the nozzle head; and
   a control unit configured to indicate a rotation of the nozzle head in dependence on the induced electrical energy.

2. The rotary cleaning nozzle according to claim 1, wherein the fluid to be fed to the nozzle head during operation via the feed duct, and to flow therethrough, rotationally actuates the nozzle head.

3. The rotary cleaning nozzle according to claim 1, further comprising a rotary drive configured to rotationally actuate the nozzle head.

4. The rotary cleaning nozzle according to claim 1, wherein, upon rotational actuation, the nozzle head is configured to expel the cleaning jet from the nozzle outlet opening in a direction facing away from a rotation direction of the nozzle head.

5. The rotary cleaning nozzle according to claim 4, wherein the direction in which the cleaning jet is expelled is opposite the rotation direction.

6. The rotary cleaning nozzle according to claim 1, wherein the nozzle head includes at least one feed section configured to divert into a direction of the nozzle outlet opening the fluid flowing to the nozzle head via the feed duct.

7. The rotary cleaning nozzle according to claim 1, wherein the nozzle assembly includes at least one feed opening that connects the feed duct to a feed section of the nozzle head in a fluid-communicating manner.

8. The rotary cleaning nozzle according to claim 1, wherein the generator comprises:
   a rotor that is arranged on or in the nozzle head; and
   a stator that is aligned with the rotor and is arranged on or in the nozzle assembly.

9. The rotary cleaning nozzle according to claim 1, wherein the generator is connected in an electrically conductive manner to the control unit in order to feed the electrical energy induced by the generator to the control unit.

10. The rotary cleaning nozzle according to claim 1, wherein the rotary cleaning nozzle comprises an energy store configured to be charged by the electrical energy induced by the generator and configured to feed the energy stored therein to the control unit.

11. The rotary cleaning nozzle according to claim 1, wherein the control unit is configured such that, in response to the electrical energy induced by the generator, the control unit emits a signal indicating the rotation of the nozzle head, wherein the signal is an electromagnetic signal or an electrical signal.

12. The rotary cleaning nozzle according to claim 1, wherein the control unit comprises a light source configured to emit light using electrical energy provided by the generator, wherein the light source is configured to emit light in the visible wavelength range and/or light in the non-visible wavelength range.

13. The rotary cleaning nozzle according to claim 1, wherein the generator comprises:
a rotor that is arranged on or in the nozzle head; and
a stator that is aligned with the rotor and is arranged on or in the nozzle assembly, wherein the rotor includes at least one magnet and the stator includes at least one induction coil or the rotor includes the at least one induction coil and the stator includes the at least one magnet.

14. The rotary cleaning nozzle according to claim 13, wherein the magnet is part of a magnet ring constructed from permanent magnets comprising a multiplicity of magnetic poles arranged adjacent to one another in a circumferential manner.

15. The rotary cleaning nozzle according to claim 14, wherein the induction coil is an annular coil embedded in a ferromagnetic cage that is provided on a side facing the magnet ring, the ferromagnetic cage includes a multiplicity of areal sections that are spaced apart from one another in a circumferential direction and the areal sections are matched in number and position to number and position of the magnetic poles of the magnet which face the areal sections.

16. The rotary cleaning nozzle according to claim 15, wherein the nozzle assembly includes at least one feed opening that connects the feed duct to a feed section of the nozzle head in a fluid-communicating manner and the nozzle assembly is of sleeve-like form and the feed duct is in form of a cutout in the nozzle assembly, the cutout opens on one side and the at least one feed opening opens into the cutout.

17. The rotary cleaning nozzle according to claim 16, wherein the control unit is configured such that, in response to the electrical energy induced by the generator, the control unit emits an electromagnetic signal indicating the rotation of the nozzle head.

18. The rotary cleaning nozzle according to claim 17, wherein the control unit is connected to the induction coil and is arranged together with the induction coil in or on the nozzle head or the nozzle assembly, wherein the nozzle head or the nozzle assembly is produced from a material which is able to be passed through by the electromagnetic signal emitted by the control unit.

19. The rotary cleaning nozzle according to claim 18, wherein the control unit is arranged in a further cutout in the nozzle assembly, which the further cutout is closed off so as to be impermeable to the fluid via a closure cap, wherein the closure cap is produced from a material that is able to be passed through by the electromagnetic signal emitted by the control unit.

20. A cleaning system for cleaning surfaces in a beverage bottling installation, comprising:
a rotary cleaning nozzle comprising:
  a nozzle assembly that has a feed duct configured for fluid;
  a nozzle head that is mounted rotatably on the nozzle assembly and that include at least one nozzle outlet opening from which, during operation, the fluid flowing through the feed duct and the nozzle head emerges in form of a cleaning jet;
  an electrical generator configured for induction of electrical energy by way of rotation of the nozzle head; and
  a control unit configured to output a signal indicating a rotation of the nozzle head in dependence on the induced electrical energy; and
a stationary monitoring unit configured to:
  receive the signal that is emitted by the control unit of the rotary cleaning nozzle and that indicates the rotation of the nozzle head; and
  output information relating to the rotation in response to the signal received.

\* \* \* \* \*